United States Patent [19]
Sheets

[11] Patent Number: 5,862,200
[45] Date of Patent: Jan. 19, 1999

[54] GROUND FAULT DETECTOR FOR T1 SPAN EQUIPMENT

[75] Inventor: Laurence L. Sheets, St. Charles, Ill.

[73] Assignee: Teltrend, Inc., St. Charles, Ill.

[21] Appl. No.: 680,833

[22] Filed: Jul. 16, 1996

[51] Int. Cl.$^6$ .............................. H04M 1/24; H04M 3/08
[52] U.S. Cl. .................................. 379/26; 379/4; 379/1; 379/2
[58] Field of Search .............................. 379/1–6, 22–26, 379/30, 12, 412, 34, 29, 296, 350, 399, 413, 343, 349, 347, 346

[56] References Cited

U.S. PATENT DOCUMENTS

| 2,601,302 | 6/1952 | Lalande | 379/4 |
| 3,100,869 | 8/1963 | Disson et al. | 379/4 |
| 3,177,303 | 4/1965 | Fingerle, Jr. et al. | 379/4 |
| 3,297,833 | 1/1967 | Hooten | 379/4 |
| 3,758,728 | 9/1973 | Le Roch et al. | 379/4 |
| 4,459,437 | 7/1984 | Gabry et al. | 379/4 |
| 4,604,745 | 8/1986 | Takasaki et al. | 379/4 |
| 5,113,426 | 5/1992 | Kinoshita et al. | 379/26 |
| 5,138,658 | 8/1992 | Carter et al. | 379/413 |
| 5,216,704 | 6/1993 | Williams et al. | 379/26 |
| 5,224,149 | 6/1993 | Garcia | 379/5 |
| 5,282,237 | 1/1994 | Babu et al. | 379/2 |
| 5,341,418 | 8/1994 | Yoshida | 379/399 |
| 5,343,361 | 8/1994 | Barton et al. | 370/13 |
| 5,390,231 | 2/1995 | Hung et al. | 379/2 |
| 5,422,929 | 6/1995 | Hurst et al. | 379/4 |
| 5,437,023 | 7/1995 | Sheets et al. | 379/5 |
| 5,438,606 | 8/1995 | Cerulli | 379/26 |
| 5,515,417 | 5/1996 | Cotreau | 379/32 |
| 5,533,092 | 7/1996 | Kaziwara | 379/21 |
| 5,661,776 | 8/1997 | Charland | 379/2 |
| 5,689,546 | 11/1997 | Sheets et al. | 379/34 |
| 5,706,328 | 1/1998 | Williman | 379/1 |

Primary Examiner—Curtis A. Kuntz
Assistant Examiner—Rexford N. Barnie
Attorney, Agent, or Firm—McDonnell Boehnen Hulbert & Berghoff

[57] ABSTRACT

A ground fault detector for TI span equipment for transmitting signals from a central office to a network interface unit and receiving signals at the central office from the network interface unit. The TI span equipment includes a first pair of cables for transmitting data payload from the central office to the network interface unit and a second pair of cables for receiving data payload at the central office from the network interface unit. A line repeater is located along the TI span equipment between the central office and the network interface unit. The line repeater includes a transformer with core and a first, second, third and fourth coil. The coils are coupled to the transmit and receive span, and the transformer core saturates when the current differential between the coils exceeds a predetermined level. When the core is saturated, signals present on the first coil are not imposed on the second coil. A detector device senses the absence of a signal on the second coil determines that there is a ground fault.

42 Claims, 2 Drawing Sheets

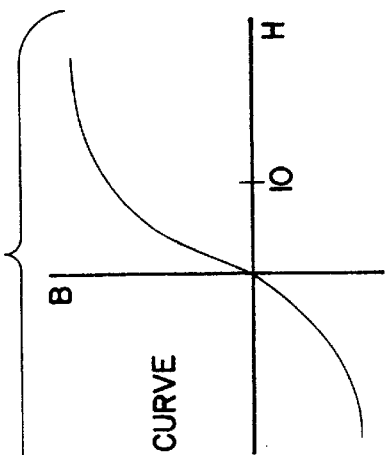
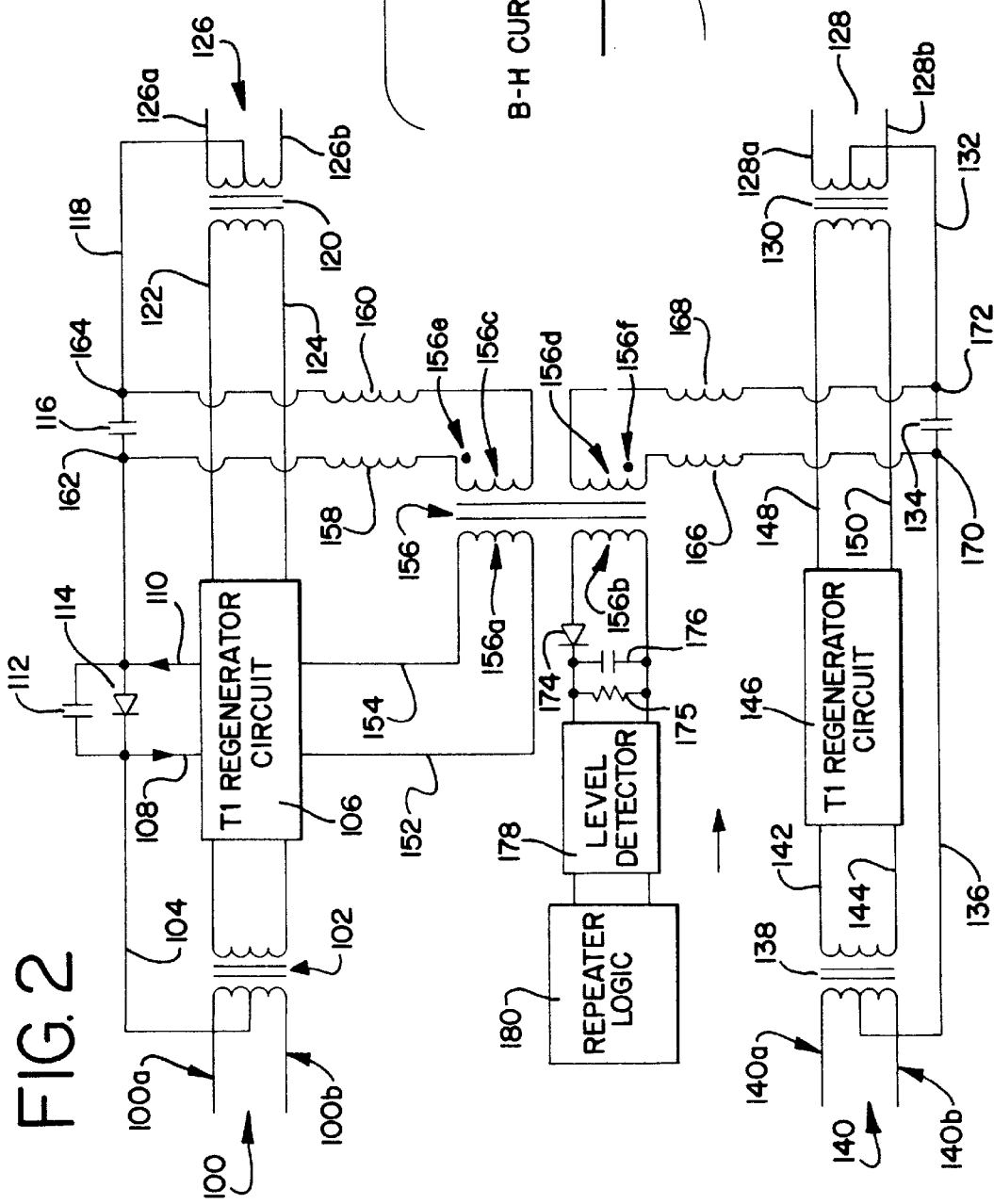

GROUND FAULT DETECTOR FOR T1 SPAN EQUIPMENT

BACKGROUND OF THE INVENTION

The present invention relates generally to data links for telecommunications transmission facilities, and, more particularly, a ground fault detector for T1 span equipment.

Many telecommunications transmission facilities include a central office that transmits data signals over transmission lines to remote terminals and customer premises. The signals may be sent over two pairs of transmission lines in a digital format or differentially on two conductors, known as a Tip-Ring Pair.

The Bell telephone system in the United States, for example, has a widely utilized Digital "D" multiplexing pulse code modulation system. A "D" channel bank, for example, commonly provides multiple DS-1 signals that are carried on T1 span equipment. One pair of cables is provided for each direction of transmission.

The data, or "payload," signals to be sent over the transmission lines are sent differentially on the Tip-Ring Pair. A longitudinal, or common mode, direct current is applied to the simplex lead to power T1 line repeaters. Payload signals are transmitted by a telephone company central office to a series of regenerative repeaters or line repeaters.

The repeaters are spaced along the transmission lines approximately every 3,000–6,000 feet. When the first repeater receives the data from the central office, the signal may have degraded due to line losses, noise, interference and distortion. The repeater recognizes the presence or absence of a pulse at a particular point in time, and thereafter, if appropriate, generates a clean, new pulse.

The repeaters are powered by the transmission cable to generate the new pulses. The new pulses are transmitted by the line repeater along more cable to either another line repeater or to a Network Interface Unit ("NIU"). The NIU, in turn, transmits signals to and from equipment on the customer premises.

Some repeaters include a dead loop feature. In dead loop mode, a break in the transmission line or a disconnection of the customer's equipment from the NIU causes the line repeater to dead loop such that the powering current feed transmitted from the central office is routed back to the central office through the last repeater in the chain capable of being powered. Accordingly, the central office is advised of an abnormality along the transmission cable. The dead loop condition will be released if, for example, the line is repaired or the customer equipment is reconnected to the NIU.

The transmission facilities generally include a central office switch that provides an analog signal to a central office channel unit. The central office channel unit converts a two wire analog signal to a digital data signal transmitted on two pairs of cables. The digital data signals are transmitted to a remote transmission channel unit, or NIU. The digital data signal is then reconverted to an analog signal and provided, in analog form, on two a wire conductor, or Tip-Ring pair, to the customer premises.

Signals that are sent via digital carrier transmission lines from the central office reach a remote terminal unit before reaching the customer premises. The remote terminal then converts the digital signal to an analog signal, which may then be an intelligible signal for a telephone.

In the remote terminal, the digital data signals sent over the T1 lines are converted to analog telephone signals and then supplied to a customer loop telephone line. The analog telephone signals may then be received by the customer premises, which may include telephones and, in some cases, PBX units. Conversely, the remote terminals receive analog telephone signals from the telephones and PBX units and convert them to digital data signals that then can be transmitted over the T1 transmission system.

In operation of the T1 span equipment, there may be a ground fault such that, in effect, a lead is attached between one of the simplex transmission cables and ground. Such a fault may occur due to damage to a transmission cable. For example, construction digging may break or damage a transmission cable, or insulation coating the cable may deteriorate due to weather damage, animal damage, or other causes. Such a ground fault may result in signal loss or noise or errors being introduced into data transmitted along the cables between the central office and the network interface unit.

Occasionally, the central office may perform a test on various T1 span equipment, such as the repeaters, to determine whether direct current (d.c.) is being supplied, and thus whether or not there is a break in the simplex lines providing power to the repeaters. For example, the central office may sense current along the lines from the customer premises and the repeaters to the central office. If power is sensed along the receive line from the repeater, the central office determines that there is no break in the lines. In the case of a high resistance short, however, current is still present along the receive line, and the presence of this current may cause the central office to determine that there is no break in the lines. However, the current level along the receive lines is lower than the current supplied by the central office along the transmit line from the central office to the network interface unit. The system may fail to recognize this differential current and thus fail to report that a ground fault has occurred.

SUMMARY OF THE INVENTION

In a principal aspect, the present invention relates to a telecommunications ground fault detector for T1 span equipment including a transmit span and a receive span. The system includes a four winding transformer with a first, second, third and fourth coil. A regenerator circuit, which is coupled to the transmit span, generates a test signal that is transmitted to the first coil. A detector unit is coupled to the second coil. The third coil of the transformer is coupled to the transmit span, and the fourth coil is coupled to the receive span. The transformer has a core material that saturates above a predetermined current differential between the third coil and the fourth coil, preventing the first coil from imposing the test signal on the second coil. Thus, the detector unit generates a detection signal in response to saturation of the core of the coil. The detection signal indicates that the current differential between the third coil and the fourth coil has exceeded a certain threshold, caused, for example, by a ground fault.

It is thus an object of the present invention to provide a more reliable system for detecting current differential between the two data leads of the T1 span. Another object of the present invention is a system that uses primarily existing equipment to detect ground faults. A further object of the invention is an inexpensive system for more accurate determination of ground faults.

These and other objects, features, and advantages of the present invention are discussed or are apparent in the following detailed description.

BRIEF DESCRIPTION OF THE DRAWINGS

In the detailed description that follows, reference will be made to the following figures:

FIG. 2 is a schematic diagram of the preferred embodiment of the present invention; and FIG. 3 is graph depicting the B-H relationship of a transformer coil of the preferred embodiment of the invention.

DETAILED DESCRIPTION OF THE PREFERRED EMBODIMENT

Figure 1:
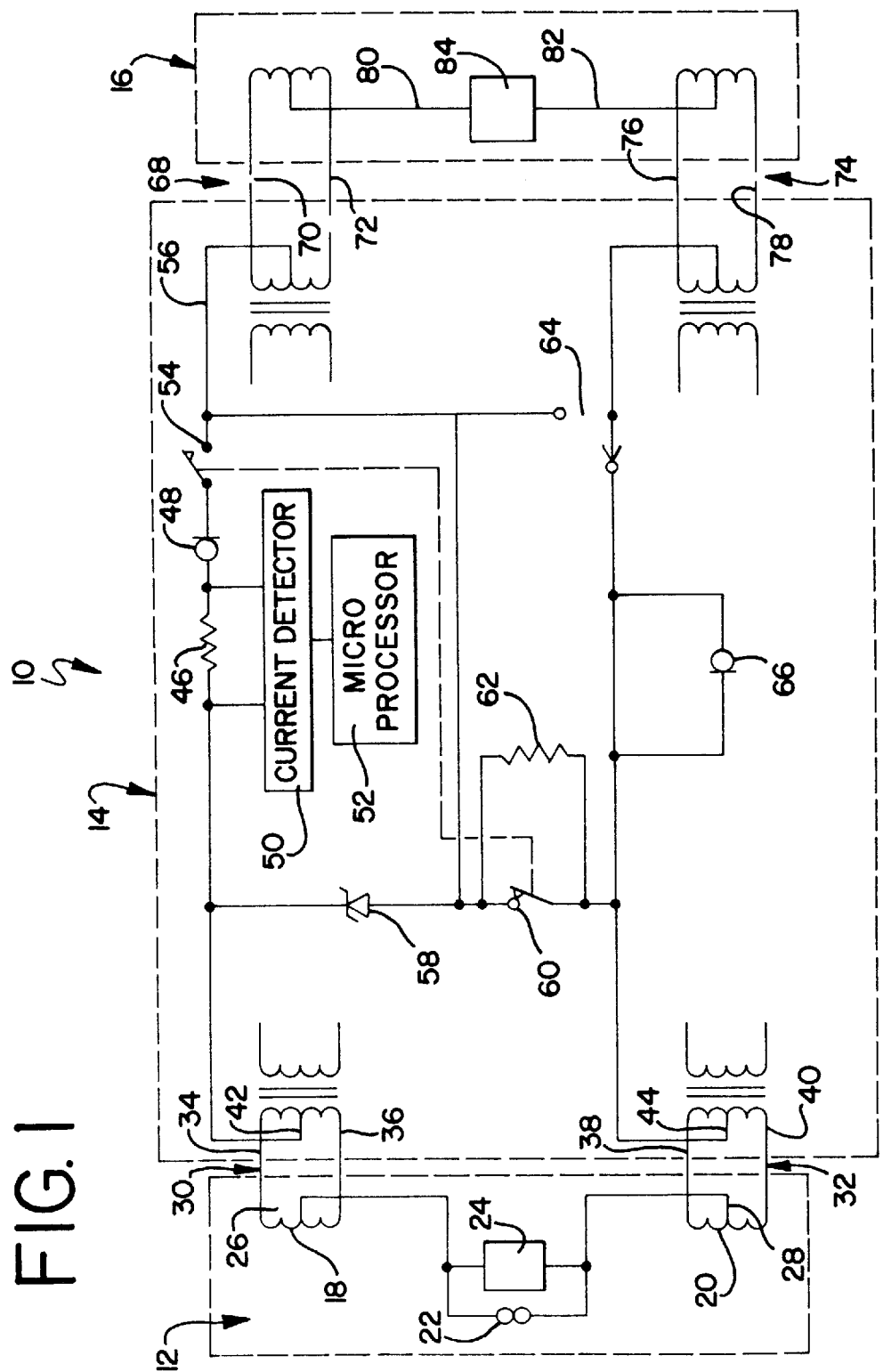
FIG. 1 is a schematic diagram of telecommunications facilities with a prior art line repeater.

FIG. 1 depicts telecommunications transmission facilities 10 including a central office 12, a prior art line repeater 14, and a remote unit or network interface unit 16 that is coupled to a customer premises (not shown).

The repeater 14 is stationed approximately 3,000 feet from the central office 12. The line repeater 14 recognizes the presence of a pulse from the central office 12 and, when appropriate, generates a clean, new pulse, transmitting it to the next line repeater (not shown.) The next line repeater is again stationed approximately 3,000 feet away.

The number of line repeaters depends on the distance between the central office 12 and the network interface unit 16. In certain situations, no line repeaters may be necessary. In other situations, many repeaters are necessary. Thus, although one line repeater 14 is shown for illustrative purposes in FIG. 1, many repeaters are typically used.

The central office 12 is located within a telephone company central office and includes transformers 18 and 20, a direct current source 22, and a central office interface 24. As shown in FIG. 1, each of the transformers 18 and 20 includes a simplex lead or center tap lead 26, 28 in a coil. Each simplex lead is connected through a coil to one of a pair of transmission cables 30 and 32. The transmission pair 30 includes lines 34 and 36, and the transmission pair 32 includes lines 38 and 40.

The current source 22 is interconnected between the two simplex leads 26, 28. The current source 22 has a nominal output of approximately 60 milliamps direct current (d.c.). The central office 12 attempts to emulate a substantially constant current supply, providing 60 milliamps at a load between 0 ohms and 4,300 ohms. The voltage may range, for example, between 0 and –130 volts. T1 span equipment is generally specified to provide between 57 and 63 milliamps d.c. over a range of loads of 0–4,300 ohms. The signal, also referred to as data signal or "payload," to be transmitted from the central office 12 to the network interface unit 16 is transmitted on the simplex lead 30.

The central office interface 24 is in parallel configuration with the current source 22. The interface 24 is coupled between the simplex leads 30, 32 in the central office 12.

The pairs of transmission cables 30, 32, also referred to as cable pairs or leads, are simplex type. The cable pair 30 is also referred to as the "transmit" pair or lead or the first data lead, and the cable pair 32 is also referred to as the "receive" pair or lead or the second data lead. Similarly, lines 34 and 36 are sometimes referred to as "transmit" lines, and lines 38 and 40 are referred to as "receive" lines. The central office 12 receives a receive data signal from the network interface unit 16 via the receive pair 32.

The designation of a line or cable pair as "transmit" or "receive" is arbitrary and is relative to transmission of a signal from the central office 12 to the network interface unit 16. In other words, signals or payload from the central office are sent on the "transmit" lines to the network interface unit 16, and signals or payload from the network interface unit 16 are sent to the central office 12 on the "receive" lines. Thus, the designation of cable pairs as transmit or receive lines is done for convenience purposes only, and from the perspective of the network interface unit 16 instead of the central office 12, the opposite designations could be made.

The data transmitted over the cable pairs 30, 32 such as speech, is sampled at a rate such as 8,000 hertz, and the amplitude of each signal is measured. The amplitude of each sample is compared to a scale of discrete values and assigned a numeric value. Each discrete value is then coded into a binary form. Representative binary pulses appear on the cable pairs 30, 32.

The binary form or each sampled pulse consists of a combination of seven pulses, or bits. An eighth bit is added to the signal at the end of the combination, or byte, to allow for error checking.

Each of the 24 channels of the T1 system is sampled within a 125 microsecond period, or every 1/8,000 of second. This period is called a "frame." To each frame, an additional, synchronizing bit is added in order to signal the end of the frame. Because there are 8 bits per channel, 24 channels, and one pulse at the end of each frame, the total number of bits per frame is 193. Thus, the resulting line rate for T1 systems is 1.544 million bits per second, or 1.544 megahertz.

The repeater 14 includes a center tap lead 42 and a center tap lead 44. The center tap lead 42 is coupled in series to a resistor 46, which is coupled to a current limiter 48. A current detector 50 is coupled in parallel to the resistor 46. A microprocessor 52 is used to analyze current detected by the current detector 50.

Early T1 repeaters were configured like a Christmas tree such that a break anywhere along the network span would render the span inoperable. In an intelligent T1 repeater, as shown in FIG. 1, the span is continually powered forward. At each repeater, a test is conducted to see if the network is free of a fault condition. If no fault condition is detected, the system is powered forward, that is, current flows forward to the next repeater. If, however, a fault condition is detected, the span is powered only to a point prior to the break, and from this point the system enters a loop back mode to return signals from the central office to the central office.

The test is conducted as follows. In "sniffing" mode, the system uses the current limiter 48 to send a sniffer signal "ahead" or to the next repeater along the line. If the current detector 50 detects a voltage across the resistor 46, the system would attach to the next repeater because it would determine that something is coupled to the repeater 14. A switch 54 is closed allowing current to flow along a line 56 toward the network interface unit 16. If the microprocessor 52 measures an appropriate current level from the current detector 50 across the resistor 46, then the microprocessor 52 determines that the network span is properly configured and the system connects ahead to the next repeater along the span or to the network interface unit 16.

If, however, there is a fault along the span, the current detector 50 may nonetheless detect a current flow across resistor 46, and the microprocessor 52 may incorrectly determine that the network span is properly connected and may connect forward. In other words, in the case of a ground fault, the system would be connected to ground. The system should not connect ahead or forward, in other words to the next repeater or the like if there is a ground fault condition. Leakage could bleed the current needed to power the system.

The repeater shown in FIG. 1 also includes a diode 58 coupled to a switch 60. The switch 60 is coupled in parallel with a resistor 62 and is configured with the switch 54. This repeater also includes a switch 64 for switching between through and loop back mode, and a current limiter 66.

The network interface unit 16 includes a transmission cable pair 68, including a line 70 and a line 72 coupled between the network interface unit 16 and the repeater 14 along the transmit span. The network interface unit 16 also includes a transmission pair 74, including a line 76 and a line 78, coupled between the network interface unit 16 and the repeater 14 along the receive span. The cable pairs 30, 32, 68 and 74 and the lines 104, 118, 136 and 132 are part of the entire span of cables between the central office 12 and the network interface unit 16, referred to as the transmit span and the receive span, respectively. Center tap lead lines 80 and 82 are coupled to additional circuitry, for example a performance monitoring link 84.

FIG. 2 is a schematic diagram depicting aspects of a preferred embodiment of the line repeater 14 shown in FIG. 1. Included in the line repeater are a pair of transmission cables 100 coupled to a transformer 102 with a center tap lead 104. The pair of transmission cables 100 includes a line 100a and a line 100b. Lines 100a and 100b are coupled to the central office or preceding repeater, not shown. For example, the cable pair 100 shown in FIG. 2 may be coupled to the cable pair 30 shown in FIG. 1.

The transformer 102 is coupled to a T1 regenerator circuit 106 that receives power from lines 108 and 110. A capacitor 112 coupled in parallel with a diode 114 regulate power provided to the T1 regenerator circuit 106. A blocking capacitor 116 is situated along the center tap lead line 104 and a center tap lead line 118 between the transformer 102 and a transformer 120.

The transformer 120 includes lines 122 and 124 coupled to the T1 regenerator circuit 106. A pair of transmission cables 126, including line 126a and 126b, couples the repeater to another repeater, a network interface unit, or a customer premises, which are not shown. For example, the cable pair 126 may be coupled to the cable pair 68 shown in FIG. 1.

Referring again to FIG. 2, the system also includes a pair of transmission cables 128, including line 128a and 128b, coupled to a transformer 130. The cable pair 128 may be coupled, for example, to the cable pair 74 shown in FIG. 1.

Turning again to FIG. 2, the transformer 130 is coupled via a center tap lead 132 to a capacitor 134, which is coupled to a center tap lead 136. The center tap lead 136 is coupled to a transformer 138. The transformer 138 includes a pair of transmission cables 140 comprising a line 140a and a line 140b, which are coupled to a central office or preceding repeater, for example via the cable pair 32 shown in FIG. 1. With respect to FIG. 2, the transformer 138 is also coupled via lines 142, 144 to a T1 regenerator circuit 146, which is also coupled via lines 148, 150 to the transformer 130.

For ease of reference, the transformer 102 may be referred to as the central office transmit transformer, the transformer 120 may be referred to as the NIU transmit transformer, the transformer 138 may be referred to as the central office receive transformer, and the transformer 130 may be referred to as the NIU receive transformer. As before the reference to transmit and receive are arbitrary. Similarly, the references to "central office" and "NIU" transformers are arbitrary, and are for ease of reference.

The T1 regenerator circuit 106 is coupled via lines 152 and 154 to a four winding transformer 156. The regenerator circuit 106 is a good source of high frequency waveforms, any one of which can be applied to the port 156a. For ease of reference, each of the four coils or ports of the transformer 156, ports one, two, three and four, respectively, are labeled 156a–d, as shown in FIG. 2. These ports are also referred to as the first, second, third and fourth ports or coils, respectively.

The port three, 156c, of the transformer 156 is also coupled via LF inductors or coils 158 and 160 to the center tap leads 104 and 118, as seen at nodes 162 and 164, respectively. The LF coils 158, 160 are high impedance and isolate the port three 156c from non-d.c. signal, such as alternating current (a.c.) signals from the center tap lines 104 and 118, preventing signal reflection from the center tap lines. In other words, only d.c. flows through the coils 158, 160. Accordingly, for a.c. signals, the load on the transformer coil 156c appears to be an open circuit rather than a short circuit. The LF coils 158, 160 could also be parallel LC devices, forming a tank circuit. Current flows into the transformer 156 at the port three 156c as indicated by the dot 156e.

Similarly, the port four, 156d, of the transformer 156 is also coupled via LF inductors or coils 166 and 168 to the center tap lead 104 and the center tap lead 136 and 132, as seen at nodes 170 and 172, respectively. The LF coils 166, 168 are high impedance and isolate the port four 156d from a.c. impedance from the center tap lines 136 and 132. Current flows from the transformer 156 at the port four 156d as indicated by the dot 156f.

Coupled to the port two 156b of the transformer 156 is a blocking diode 174, a capacitor 176 and a resistor 175. The capacitor 176 is coupled in parallel to the coil 156b, and stores a charge when a signal is present on the fourth coil 156b. A level detector 178 is coupled in parallel to the capacitor 176. In a preferred embodiment, the level detector 178 is a CMOS gate array with a 2.5 volt threshold. Alternatively, the level detector 178 may also be an op-amp comparator arrangement. Repeater logic 180 is also coupled to the level detector 178. The resistor 175 and the level detector input at resistor 175 create an extremely high D.C. resistance. This prevents any significant amount of rectified D.C. current from flowing into the port 156b of the transformer.

The transformer 156 includes a core with a specifically designed core material having a marked B-H curve bend for a particular differential current. An illustration of the B-H curve of the transformer 156 is shown in FIG. 3. At a 10 milliamp current differential, the core of the transformer 156 is substantially saturated. If the current differential is near zero, the flux is zero.

In operation, a test signal is transmitted from the T1 regenerator circuit 106 to the first port 156a of transformer 156. In a preferred embodiment, the test signal is a 2 milliamp a.c. signal at 1.544 MHz or a related repeater clock frequency. The level detector 178 measures a level signal at the second port 156b. If the level detector 178 detects no signal or a sufficiently low signal, the repeater logic 180 determines that there is a ground fault condition. So long as the third port 156c and the fourth port 156d are not short circuits, or low impedance, the second port 156b will detect the test signal on the first port 156a.

If no current is diverted from the lines 100a et seq through a ground fault, the current through the third port 156c substantially equals the current through the fourth port 156d. Thus, the windings of the transformer remain balanced and the core is not saturated. If, however, some current is diverted to ground, the current in the third port 156c and fourth port 156d will differ by the amount of diverted current. If the current differential between the third port 156c and the fourth port 156d exceeds a predetermined level, the core will saturate. Thus, the first port 156a will not be able to impress a voltage on the second port 156b.

When there is no signal on the second port 156b, the capacitor 176 discharges momentarily across the level detector 178. The diode 174 rectifies the signal on the capacitor 176. Once the capacitor is discharged, the voltage across the level detector detects that there is no signal on the port 156b. The resistor 175 and the capacitor 176 cooperatively define a (RC) time constant that insures that a temporary signal loss or disruption will not cause the detector 178 to detect no signal. In this manner, the detector 178 does not detect the absence of a signal on the coil 156b unless the length of time of the absence of the signal exceeds the capacitor discharge time. Thus, brief current differentials between the transmit span and the receive span do not result in a detection signal even if the transformer 156 saturates, preventing false ground fault signals.

Upon detection of a ground fault, the repeater logic 180, which may consist, for example, of a microprocessor, will not connect to the next repeater. Instead, the repeater will be locally powered. The repeater may also enter loop back mode and transmit data or an alert signal to the central office 12.

In sum, when no signal is present on the second coil 156b, caused, for example, when the transformer 156 core saturates, the level detector 178 generates a signal, such as a low signal or detection signal. The low signal indicates that a ground fault exists between the transmit and receive simplex leads 126, 128. This low signal may be provided by the existing line equipment to the central office 12. In this manner, when the system is in loop back mode, the repeater 14 may communicate to the central office 12 that a current differential exists between the transmit and receive lines.

Although a T1 coil typically would not saturate even with a current differential in excess of 100 milliamps, the transformer 156 may be configured to saturates with a current differential of just a few tenths of a milliamp. In a preferred embodiment, if the current differential between the first coil 156a and the second coil 156b exceeds 10 milliamps, the core of the transformer 156 will saturate, preventing a signal on the first port 156a from being impressed on the second port 156b.

The capacitor 116 insures that none of the signal from the first port 156a is transmitted along the center tap lines 104 and 118, which could cause interference problems. The capacitor 134 functions similarly.

For example, the transmission cable pair 126 along the transmit span may include a ground fault. As a result, there is a current drain to ground. Thus, for example, the central office 12 may be providing 60 milliamps of current along the transmit pair 30 to the repeater shown in FIG. 2. If the ground fault causes a 20 milliamp current loss, that is, 20 milliamps of current is shunted to ground, then the current level along the receive pair 128 on the receive line is 40 milliamps. As described, the core of the transformer 156 thus substantially saturates because the current differential exceeds 10 milliamps. Thus, the system successfully detects the ground fault.

Although not shown in the Figures, any of the plurality of repeaters between the central office 12 and the network interface unit 16 may be similarly configured to detect ground faults. Similarly, other equipment in the T1 span, such as the network interface unit 16 may also be similarly configured to detect ground faults.

It is to be understood, however, that alternative forms of the various components of the described embodiments are covered by the full scope of equivalents of the claimed invention. To particularly point out and distinctly claim the subjects regarded as the invention, the following claims conclude this specification.

What is claimed is:

1. A ground fault detector for use in a telecommunications network having a transmit span and a receive span, said ground fault detector comprising, in combination:

a regenerator circuit coupled to said transmit span and generating a test signal;

a transformer comprising a first coil coupled to said regenerator circuit, a second coil, a third coil coupled to said transmit span, and a fourth coil coupled to said receive span, said transformer having a core material that saturates above a predetermined current differential between said third coil and said fourth coil and thereby prevents said first coil from imposing said test signal on said second coil; and a detector unit coupled to said second coil, said detector unit generating a detection signal in response to saturation of said core, said detection signal indicating that a ground fault exists between said transmit span and said receive span.

2. A ground fault detector as in claim 1 wherein said detector unit is contained in a repeater in telecommunications transmission facilities, said facilities including a central office and a network interface unit.

3. A ground fault detector as in claim 2 wherein said transmit span comprises a pair of wires that transmits data from said central office customer premises, said receive span comprises a pair of wires that receives data at said central office from said customer premises, and said detector unit provides said detection signal in response to a ground fault between said transmit span and said receive span.

4. A ground fault detector as in claim 3 wherein said detection signal is provided to said central office on said receive span to indicate that a ground fault exists between said transmit span and said receive span.

5. A ground fault detector as in claim 4 further including a capacitor coupled to a rectifier on said second coil, said capacitor providing current to said detector unit during brief signal loss on said second coil.

6. A ground fault detector as in claim 5 further comprising a diode rectifier coupled between said capacitor and said second coil for preventing said capacitor from applying reverse current to said second coil.

7. A ground fault detector as in claim 6 wherein said predetermined current differential is 10 milliamps.

8. A ground fault detector as in claim 7 further comprising at least one inductor coupled to said third coil, said at least one inductor providing a substantially high impedance to non-d.c. signals.

9. A ground fault detector as in claim 7 further comprising at least one inductor coupled in series with said third coil, said at least one inductor providing open circuit impedance to a.c. signals.

10. A ground fault detector as in claim 9 further comprising repeater logic coupled to said detector unit, said repeater logic analyzing said detection signal and responsively looping back said repeater to said central office.

11. A ground fault detector as in claim 10 wherein said repeater logic comprises a microprocessor.

12. A method of detecting a ground fault in a telecommunications network, wherein said network includes a central office, a network interface unit, a first and second pair of simplex transmission cables coupled between said network interface unit and said central office, and a repeater coupled to said first and second transmission cables, said method comprising, in combination:

providing in said repeater a transformer comprising a core, a first coil coupled to said first pair of simplex cables, a second coil coupled to a detector device, said first and second coils configured to impose a signal from said first coil on to said second coil, a third coil, and a fourth coil;

measuring a differential current between said third coil and said fourth coil, said transformer core saturating if said differential current exceeds a predetermined threshold and thereby preventing said first coil from imposing a signal on said second coil;

applying said detector device to detect a signal level on said second coil;

in response to said signal level being lower than a predetermined level, determining that a ground fault condition exists; and alerting said central office of said ground fault condition.

13. A method as in claim 12 wherein said alerting step comprises the step of looping back said repeater to said central office.

14. A method as in claim 12 wherein said alerting step comprises the step of transmitting an alert signal to said central office.

15. A method as in claim 12, further comprising, in combination:

coupling said first coil to a regenerator circuit; and said regenerator circuit providing a high-frequency signal.

16. A method as in claim 15 further comprising the steps of providing temporary current from a capacitor to said detector device in the event of an absence of a signal on said second coil, said capacitor coupled to said first coil through a rectifier diode.

17. A method as in claim 16 further comprising the step of preventing said capacitor from providing said temporary current to said first coil by a blocking diode.

18. A method as in claim 17 further comprising the steps of preventing a.c. signals on said third coil by a first and a second inductor.

19. A method as in claim 18 further comprising the steps of preventing a.c. signals on said fourth coil by a third and fourth inductor.

20. A method as in claim 19 wherein said predetermined threshold is 10 milliamps.

21. In telecommunications facilities comprising in combination:

a central office;

a network interface unit;

a transmit span and a receive span between said central office and said network interface transmitting to and receiving from said network interface unit data over said transmit span and receive span;

a repeater including a ground fault detector comprising in combination:

a regenerator circuit coupled to said transmit span;

a transformer comprising:

a first, second, third and fourth coil, said first coil coupled to said regenerator circuit, said third coil coupled via a first and a second inductor to said transmit span, said fourth coil coupled via third inductor and a fourth inductor to said receive span; and a core, said core substantially saturated when a current differential between said third coil and said fourth coil exceeds a predetermined threshold, said saturated core preventing said first coil from imposing a test signal on said second coil; and a detector unit detecting a level signal on said second coil.

22. Telecommunications facilities as in claim 21 further comprising in combination:

a capacitor coupled in parallel to said second coil through a rectifier diode, said capacitor discharging a current through said detector unit in response to a voltage drop across said capacitor; and a diode coupled between said capacitor and said fourth coil providing current flow in only one direction from said fourth coil to said capacitor.

23. Telecommunications facilities as in claim 22 further comprising in combination a microprocessor coupled to said detector unit and looping back said repeater to said central office when said level signal on said second coil is less than a predetermined threshold.

24. In a telecommunications network including a central office, a network interface unit, a transmit span and a receive span between said central office and said network interface unit transmitting to and receiving from said network interface unit data over said transmit span and said receive span, a repeater with a ground fault detector comprising, in combination:

a transformer comprising a core, a first coil, a second coil, a third coil and a fourth coil;

said third coil being coupled via first and second inductors to said transmit span;

said fourth coil being coupled via third and fourth inductors to said receive span;

when a current differential between said third and fourth coils exceeds a predetermined threshold, said core being substantially saturated and preventing a test signal from passing from said first coil to said second coil; and a detector for detecting a signal level on said second coil.

25. A repeater as claimed in claim 24, further comprising, in combination:

a capacitor coupled in parallel to said second coil through a rectifier diode, said capacitor discharging a current through said detector unit in response to a voltage drop across said capacitor; and a diode coupled between said capacitor and said fourth coil providing current flow in only one direction from said fourth coil to said capacitor.

26. A repeater as claimed in claim 25 further comprising in combination a microprocessor coupled to said detector unit and looping back said repeater to said central office when said signal level on said second coil is less than a predetermined level.

27. In a telecommunications network including a central office, a network interface unit, a transmit span and a receive span between said central office and said network interface unit transmitting to and receiving from said network interface unit data over said transmit span and said receive span, a repeater with a ground fault detector comprising, in combination:

a transformer comprising a core, a first coil, a second coil, a third coil and a fourth coil, said third coil being coupled via a high impedance a.c.-blocking device to said transmit span, said fourth coil being coupled via a high impedance a.c.-blocking device to said receive span, wherein, when a current differential between said third and fourth coils exceeds a predetermined threshold, said core is substantially saturated and prevents a test signal from passing from said first coil to said second coil; and a detector for detecting a signal level on said second coil.

28. A repeater as claimed in claim 27, further comprising, in combination:

a capacitor coupled in parallel to said second coil through a rectifier diode, said capacitor charged by a current through said detector unit in response to a voltage drop across said second coil; and a diode coupled between said capacitor and said fourth coil providing current flow in only one direction from said second coil to said capacitor.

29. A repeater as claimed in claim 28 further comprising in combination a microprocessor coupled to said detector unit and looping back said repeater to said central office when said signal level on said second coil is less than a predetermined level.

30. In a telecommunications network including a central office, a network interface unit, a transmit span and a receive span between said central office and said network interface unit transmitting to and receiving from said network interface unit data over said transmit span and said receive span, a ground fault detector comprising, in combination:

a transformer comprising a core, a first coil, a second coil, a third coil and a fourth coil, said third coil being coupled via a high impedance a.c.-blocking device to said transmit span, said fourth coil being coupled via a high impedance a.c.-blocking device to said receive span, wherein, when a current differential between said third and fourth coils exceeds a predetermined threshold, said core is substantially saturated and prevents a test signal from passing from said first coil to said second coil; and a detector for detecting a signal level on said second coil.

31. A method of detecting a ground fault in a telecommunications network, said telecommunications network including a central office, a network interface unit, transmit and receive lines carrying data signals between said central office and said network interface unit, and a repeater coupled to said transmit and receive lines, said method comprising, in combination:

providing in said repeater a transformer comprising a core, a first coil, a second coil, a third coil and a fourth coil, said transformer core substantially saturating in response to a current differential of higher than a predetermined threshold between said third and fourth coils, and said transformer being configured to impose a signal from said first coil to said second coil unless said transformer core is substantially saturated;

coupling said first coil to a signal generator;

coupling said second coil to a detector device;

coupling said third coil via a high impedance a.c.-blocking device to said transmit lines;

coupling said fourth coil via a high impedance a.c.-blocking device to said receive lines;

applying said signal generator to impose a test signal on said first coil;

applying said detector device to detect a signal level on said second coil;

in response to said signal level being lower than a predetermined level, determining that a ground fault condition exists; and alerting said central office of said ground fault condition.

32. A method as claimed in claim 31, wherein alerting said central office comprises looping back said repeater to said central office.

33. A method as claimed in claim 31, wherein alerting said central office comprises transmitting an alert signal to said central office.

34. A method as claimed in claim 31, further comprising providing temporary current from a capacitor to said detector device in the event of an absence of a signal on said second coil, said capacitor coupled to said first coil through a rectifier diode.

35. A method as claimed in claim 34, further comprising preventing said capacitor from providing said temporary current to said first coil by providing a blocking diode.

36. A method as claimed in claim 31, wherein said predetermined threshold is 10 milliamps.

37. A method of detecting a ground fault in a telecommunications network, said telecommunications network including a central office, a network interface unit, transmit and receive lines carrying data signals between said central office and said network interface unit, said method comprising, in combination:

providing a transformer comprising a core, a first coil, a second coil, a third coil and a fourth coil, said transformer core substantially saturating in response to a current differential of higher than a predetermined threshold between said third and fourth coils, and said transformer being configured to impose a signal from said first coil to said second coil unless said transformer core is substantially saturated;

coupling said first coil to a signal generator;

coupling said second coil to a signal level detector;

coupling said third coil via a high impedance a.c.-blocking device to said transmit lines;

coupling said fourth coil via a high impedance a.c.-blocking device to said receive lines;

applying said signal generator to impose a test signal on said first coil;

applying said signal level detector to detect a signal level on said second coil;

in response to said signal level being lower than a predetermined level, determining that a ground fault condition exists; and alerting said central office of said ground fault condition.

38. A method as claimed in claim 37, wherein alerting said central office comprises looping back said repeater to said central office.

39. A method as claimed in claim 37, wherein alerting said central office comprises transmitting an alert signal to said central office.

40. A method as claimed in claim 37, further comprising providing temporary current from a capacitor to said detector device in the event of an absence of a signal on said second coil, said capacitor coupled to said first coil through a rectifier diode.

41. A method as claimed in claim 40, further comprising preventing said capacitor from providing said temporary current to said first coil by providing a blocking diode.

42. A method as claimed in claim 37, wherein said predetermined threshold is 10 milliamps.

* * * * *